United States Patent [19]

Heimbrodt et al.

[11] Patent Number: 4,706,738
[45] Date of Patent: Nov. 17, 1987

[54] RADIATOR GRILL FOR MOTOR VEHICLES

[75] Inventors: Klaus- J. Heimbrodt, Treuchtlingen; Götz Motting, Boblingen; Albert Hack, Sindelfingen, all of Fed. Rep. of Germany

[73] Assignee: Daimler-Benz Aktiengesellschaft, Stuttgart, Fed. Rep. of Germany

[21] Appl. No.: 911,670

[22] Filed: Sep. 25, 1986

[30] Foreign Application Priority Data

Sep. 24, 1985 [DE] Fed. Rep. of Germany ....... 3533974

[51] Int. Cl.⁴ .............................................. F01P 7/10
[52] U.S. Cl. .................................. 165/98; 123/41.04; 236/35.2; 251/61.1
[58] Field of Search ................. 165/98, 99; 123/41.04, 123/41.05; 236/35.2; 251/5, 61.1, 212

[56] References Cited

U.S. PATENT DOCUMENTS

| | | | |
|---|---|---|---|
| 1,931,356 | 10/1933 | Porter | 165/98 |
| 3,011,518 | 12/1961 | Day et al. | 137/601 |
| 3,760,779 | 9/1973 | MacLennam | 123/41.05 |
| 4,124,066 | 11/1978 | Taylor | 165/98 |
| 4,457,336 | 7/1984 | Allan et al. | 137/601 |
| 4,457,558 | 7/1984 | Ishikawa | 296/15 |
| 4,476,820 | 10/1984 | Nixon | 123/41.05 |

FOREIGN PATENT DOCUMENTS 3151435 7/1982 Fed. Rep. of Germany .

Primary Examiner—Albert W. Davis, Jr.
Assistant Examiner—Richard R. Cole
Attorney, Agent, or Firm—Barnes & Thornburg

[57] ABSTRACT

The application relates to a radiator grill for motor vehicles which comprises a plurality of lamellae oriented parallel and arranged at mutual intervals, the free interstices between the lamellae being able to be closed by pressurizable flexible hose(s) as a function of the cooling water temperature of an internal combustion engine, with each of the pressurized adjacent hose(s) being braced mutually in the closed position. The invention provides that such a radiator grill can be developed so that no particularly high pressure needs to be exerted to deform the hose(s), since the hose(s) flex into a closing position and no particularly high strength requirements need be imposed for the resilient properties of the hose material as the hose(s) flex outwardly and do not inflate. Additionally, a simple clip mechanism is provided to attach the hose(s) to the lamellae.

7 Claims, 3 Drawing Figures

RADIATOR GRILL FOR MOTOR VEHICLES

BACKGROUND

The invention relates to a radiator grill for motor vehicles which comprises a plurality of lamellae oriented parallel and arranged at mutual intervals, the free interstices between the lamellae being able to be closed by the flexing of pressurizable flexible hoses as a function of the cooling water temperature of an internal combustion engine, whilst each two pressurized adjacent hoses are braced in mutual contact in the closed position.

RELATED ART

A closure device for a radiator grill, which operates with inflatable hoses which are in mutual contact in an inflated state, can be found in U.S. Pat. No. 4,124,066. In that arrangement, change in shape of the hose upon a pressure increase is effected virtually exclusively by expansion in a balloon-like fashion. This means that the hose material must be resiliently expandable to a high degree, and that a relatively high pressure must be available for the inflation.

SUMMARY OF THE INVENTION

It was therefore the object of the present invention to develop further a radiator grill of the type initially defined so that no unduly high pressure is necessary to deform the hose by inflation, expansion and distension of the hose in a balloon-like fashion and that no particularly high requirements need be imposed for the resilient properties of the hose material. A 100% self-return of the hose upon cessation of the positive pressure is not necessary, and the hoses should be simple to lay and to fasten.

This object is achieved according to the invention by the combination of the following features:

a. The hose(s) are connected to a negative and positive pressure source, reversible as a function of the cooling water temperature;

b. The hoses exhibit an approximately H-shaped cross-section under vacuum conditions and an expansion chamber is arranged in each upright member;

c. Filling of the expansion chamber with pressure causes the outer side wall of the H-shaped chamber to lean outwardly while reducing height by causing the upper external and internal edges of the H-shape to move outwardly at their upper end to assume an overall V-shaped configuration.

d. Approximately U-shaped downwardly open clips for fastening the hose(s) to flange-like parts of the radiator grill are connected to the underside of the crossbar.

In order to ensure that the passage of pressurized medium is possible even in the case of a curved hose configuration, the crossbar may terminate in a bracing shoulder within each expansion chamber. Thus, the hose means flexes outwardly at its top without inflation and stretching of its sides due to inflation such as would occur in a balloon.

As a further development of the invention, it is proposed that the hose(s) be laid in a meander-shaped configuration. By this development, fewer connections are necessary—in the extreme case, only a single hose may be used—which reduces the danger of leaks.

In order to promote a controlled deformation from the normal H-shape to a V-shape, it is further proposed that intended flexure points in the form of depressions are provided on the top side of each upright member.

As a further development of the invention, a secure retention of the hoses may be achieved in that the U-shaped clips exhibit in the region of their base an enlargement which is adapted to a corresponding thickening at the free end of the flange-like parts of the radiator grill.

A single hose coiled in a meander-shape fashion or a plurality of hoses either of straight sections or also coiled in sections of the grill can be utilized.

Lastly, a further contribution is made to the simplification of the assembly if the free ends of the U-members are bent outwards.

These and other objects, features and advantages of the present invention will become more apparent from the following description when taken in connection with the accompanying Drawings which show, for the purposes of illustratioon only, two embodiments in accordance with the present invention, and wherein:

DESCRIPTION OF THE PREFERRED EMBODIMENT

Figure 1:
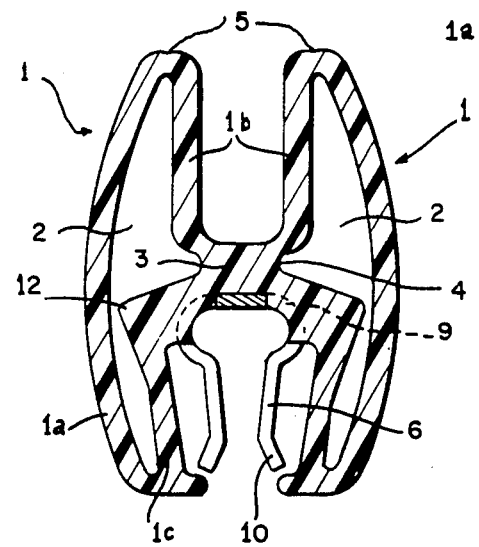
FIG. 1 shows a cross-section through a hose.

Referring now to the Drawings wherein like reference numerals are used to designate like parts and more particularly to FIG. 1, it is noted that the hose of the radiator grill illustrated in cross-section in FIG. 1 is of approximately H-shaped construction and exhibits an expansion chamber 2 in each of its upright members 1. Each of these two expansion chambers 2 is bounded by an external wall 1a and internal walls 1b and 1c. Above the crossbar 3 the walls 1b are recessed at 4, in order to promote a controlled deformation of the upper portions of the walls 1a and 1b from the normal H-shape to a V-shape. Depressions 5 on the top side of each member 1 serve the same purpose.

The crossbar 3 has connected firmly to it in the region of its underside a downwardly open, U-shaped clip 6, which serves for fastening the hose to flange-like parts 7 of the radiator grill. The clip 6 exhibits, in the region of its base an enlargement 9, to receive a thickened end portion 8 at the free end of the flange-like parts 7. In order to facilitate the assembly, the free ends 10 of the U-members of the clip 6 are bent outwards.

Figure 3:
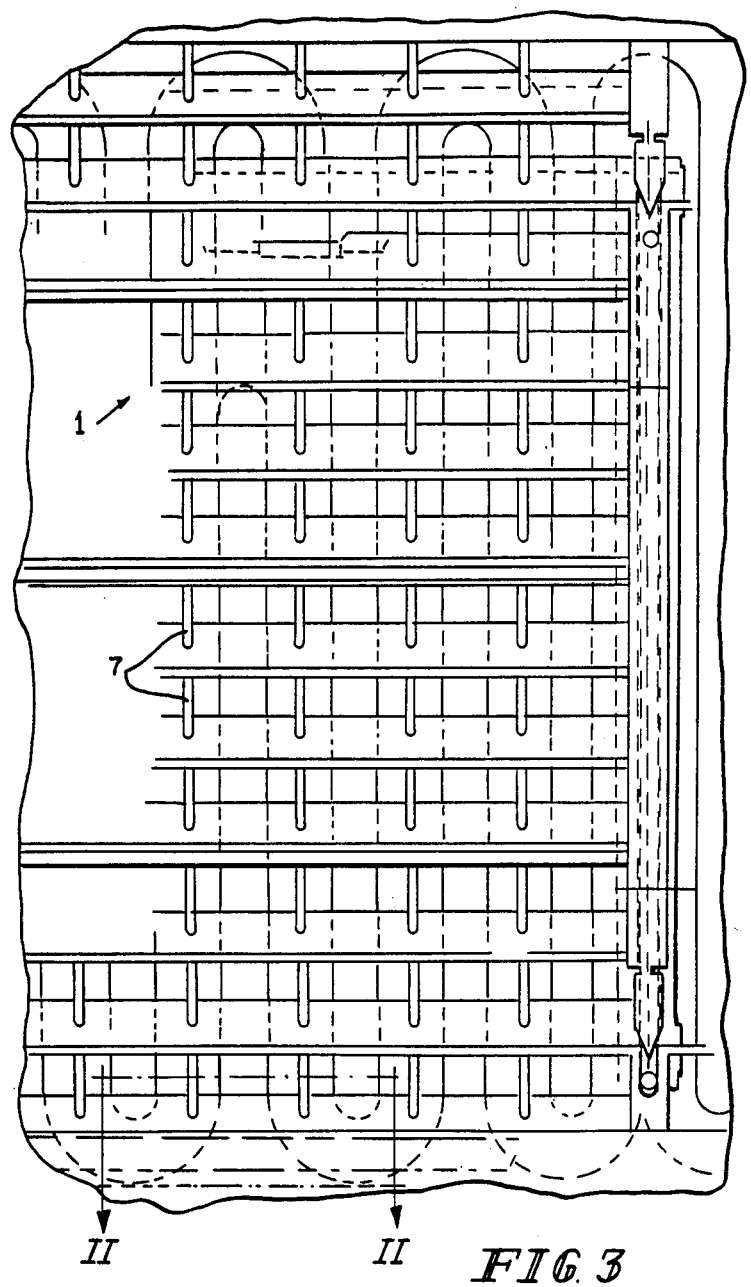
FIG. 3 shows part of a radiator grill with a meander-shaped hose configuration.

In order to ensure that the pressurized medium has free passage through the expansion chambers 2 at the curved regions 11 (see FIG. 3) which are produced by the coiling of the hose, as is the case with the meander-shaped configuration according to FIG. 3, the crossbar 3 terminates in a bracing shoulder 12 within each expansion chamber 2.

Figure 2:
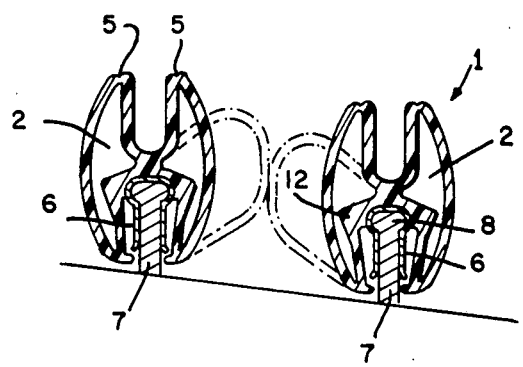
FIG. 2 shows on a smaller scale a cross-section through two adjacent, fitted hoses taken along the line II—II of FIG. 3.

The interior of the expansion chamber in the hose 1 is connected alternatively to a source of pressure or vacuum to cause the top portions of the hose as viewed in FIGS. 1 and 2 to be flexed outwardly from the shown H-shape to a V-shape. (See the dotted portions of FIG. 2 wherein two adjacent sides of the H-shape are flexed outwardly at their top portion to form one leg of the V-shaped). The particular source of pressure and vacuum can be of any conventional operation which is controlled by the temperature of the radiator water. For example, the vacuum source could be from the inlet manifold and the pressure source from an auxiliary air pump. A thermostatic responsive valve can connect the chamber to the pressure or vacuum sources. Aternatively a switch could connect the hose with a pump output, or energize a pump when the temperature of the water in the radiator is low. Alternatively, the control could connect the chamber of the tube via a conventional valve (disconnecting the pump or pump output) to the vacuum source when the temperature is increased.

The pressurized position of the hoses is illustrated by chain-dotted lines in FIG. 2 of the drawing.

Thus it can be seen that upon application of a vacuum to the interior chamber 2, the hose assumes the unflexed configuration shown in FIG. 1 wherein free pssage of cooling air occurs between adjacent hose sections as shown in full lines in FIG. 2. Upon application of pressure to the interior chamber 2, the upper portions of the hose 1 (at the general area of depression 5) are flexed outwardly to form a generally V-shaped as shown in FIG. 2 (only cooperating halves of the V-shaped are shown in dotted lines) wherein cooperating halves of the V-shape abut to close off the passage between two adjacent hose sections to prohibit the passing of cooling air to the radiator (not shown) located behind the grill structure.

The solution according to the invention therefore presents the advantage that the deformation of the hose occurs to a substantial degree by flexure, and only to a smaller degree by expansion.

Because the hose is negatively pressurized in its rest position, the return forces inherent in the hose must only be dimensioned so tht emergency operation remains possible in the case of negative pressure failure, meaning that, for example, an inside aperture of 70% of the value theoretically possible is achieved.

Because the expansion fraction is small, only relatively low pressures are also required to deform the hose.

While we have shown and described only two embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A radiator grill for motor vehicles which comprises a plurality of parallel oriented lamellae arranged at mutual intervals with free interstices between the lamellae being able to be closed by pressurizable flexible hose means as a function of the cooling water temperature of an internal combustion engine;

wherein each of adjacent hose means are fastened on the lamellae and have internal chambers therein; and wherein the internal chambers of the hose means are connected to either negative or positive pressure sources as a function of the cooling water temperature; the improvement comprising that: the hose means exhibit an approximately H-shaped cross section in a normal unflexed condition; and wherein there are approximately U-shaped downwardly opening clips for fastening the hose means to the plurality of parallel lamellae of the radiator grill connected to the underside of a crossbar portion of the H-shaped hose means.

2. A radiator grill according to claim 1, characterized in that the crossbar portion terminates in a bracing shoulder of the hose means located within each expansion chamber.

3. A radiator grill according to claim 1, characterized in that the hose means is laid in a meander-shaped configuration.

4. A radiator grill according to claim 1, characterized in that intended flexure points in the form of depressions are provided on the top side of each of an upper portion of the H-shaped hose means.

5. A radiator grill according to claim 1, characterized in that the approximately U-shaped clips exhibit in the region of their base an enlargement which is adapted to engage a corresponding thickening portion at a free end of the parallel lamellae of the radiator grill.

6. A radiator grill according to claim 1, characterized in that free ends portions of the U-shaped clips are bent outwards.

7. A radiator grill according to claim 1, characterized in that the hose means comprises a plurality of hose sections each individually connected to the negative and positive pressure sources.

* * * * *